US009860537B2

(12) United States Patent
Lawrence et al.

(10) Patent No.: US 9,860,537 B2
(45) Date of Patent: Jan. 2, 2018

(54) MULTI-FOCUS IMAGE DATA COMPRESSION

(71) Applicant: Intel Corporation, Santa Clara, CA (US)

(72) Inventors: Sean J. Lawrence, Bangalore (IN); Ankita Tapaswi, Pune (IN)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 14/572,754

(22) Filed: Dec. 16, 2014

(65) Prior Publication Data

US 2016/0173883 A1 Jun. 16, 2016

(51) Int. Cl.
*H04B 1/66* (2006.01)
*H04N 19/14* (2014.01)
*H04N 19/597* (2014.01)
*H04N 19/117* (2014.01)
*H04N 19/17* (2014.01)

(52) U.S. Cl.
CPC ........... *H04N 19/14* (2014.11); *H04N 19/117* (2014.11); *H04N 19/17* (2014.11); *H04N 19/597* (2014.11)

(58) Field of Classification Search
CPC ...... H04N 19/117; H04N 19/14; H04N 19/17; H04N 19/597
USPC .......................................................... 348/46
See application file for complete search history.

(56) References Cited

U.S. PATENT DOCUMENTS

| 2007/0291836 A1* | 12/2007 | Shi ................. H04N 21/234381 375/240.01 |
| 2009/0034629 A1* | 2/2009 | Suh ........................ H04H 20/30 375/240.27 |
| 2012/0294374 A1* | 11/2012 | Said ..................... H04N 19/507 375/240.25 |
| 2012/0314027 A1* | 12/2012 | Tian ....................... H04N 7/181 348/43 |
| 2014/0118570 A1* | 5/2014 | Chehade .............. G06K 9/4671 348/222.1 |
| 2014/0240463 A1* | 8/2014 | Pitts ................... H04N 5/23212 348/46 |

* cited by examiner

*Primary Examiner* — Jamie Atala
*Assistant Examiner* — Kathleen Nguyen
(74) *Attorney, Agent, or Firm* — Green, Howard & Mughal LLP.

(57) ABSTRACT

Systems and methods for converting multi-focus image data into a compressed video format. Multi-focus image data of a scene may be sampled to generate a stack of images spanning multiple focal depths. Each image focal distance is mapped to a time stamp and a video encoder is employed to generate a compressed video stream of scene information. In further embodiments, the video encoded scene information is decoded and frames from the stream selected for display based on the focal distance-time stamp mapping. In further embodiments, multi-focus video data is encoded with consecutive frames spanning different focal distances defining a Group of Pictures (GOP), and/or spanning different hierarchical layers.

8 Claims, 14 Drawing Sheets

MULTI-FOCUS IMAGE DATA COMPRESSION

BACKGROUND

Handheld light field cameras, also called plenoptic cameras, have become more prevalent in the commercial marketplace. Such cameras employ a lens array to capture 4D light field information about a scene. A 4D light field describes radiance along rays in empty space and a light field camera samples this field. A popular feature of handheld light field cameras is the ability to refocus images after they are captured. This may be done for example through synthetic aperture photography where a subset of the light field samples are integrated to approximate a view of the scene that would be captured by a camera having a finite aperture. By warping the light field before performing this integration, one can focus on different planes in the scene. This multi-focus image information available from a light-field camera adds depth information providing a new layer of interactivity to conventional still photo images confined to 2D.

Currently, light field image data may be stored in a variety of formats as the data is the basis for a computational photography model from which an image at a particular focal distance for display is rendered. Depending on the rendering algorithms employed, a light-field camera file may be of a proprietary format and be many times larger than a conventionally compressed 2D image for a given resolution. As such, multi-focus (multi-focal) image generation may be computationally intensive and/or require proprietary technology limiting the audience. Accordingly, techniques and systems for extracting and storing multi-focus image data in a compressed standardized format would enable a larger marketplace for the creation and sharing of such image data.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
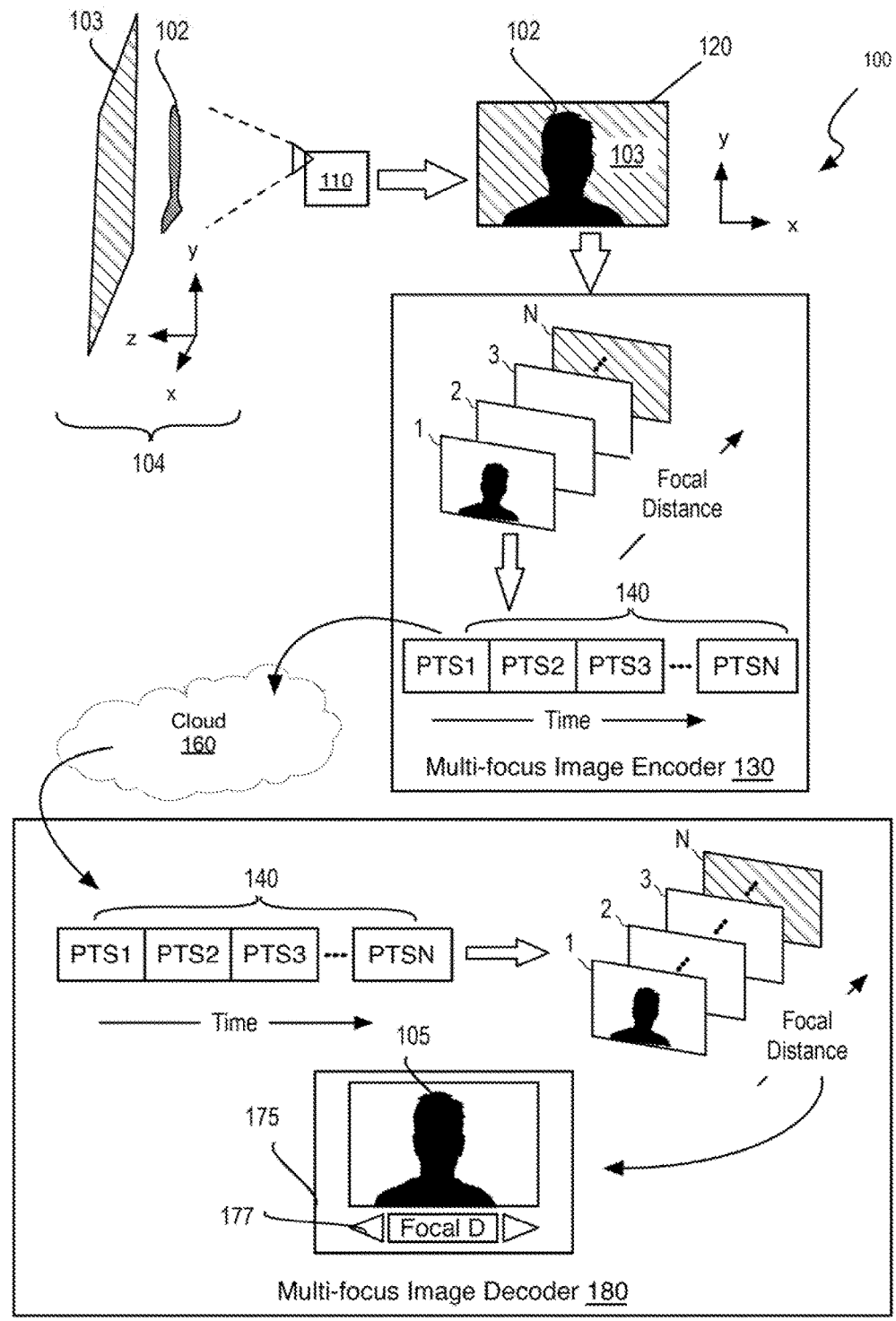
FIG. 1 is a schematic of a multi-focus image compression system, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Methods, devices, apparatuses, computing platforms, and articles are described herein for conversion and encoding of multi-focus image data into a standard compressed video format. In some embodiments, one or more system, apparatus, method, and computer readable media is described below to extract, sample, or render multi-focus image data for a scene to generate a stack of images of the scene spanning multiple focal depths. In some embodiments, each image focal distance is mapped to a time stamp and a video encoder is employed to generate a compressed video stream of the scene information. In some embodiments, the video encoded scene information is decoded and frames from the video bitstream selected for display based on the focal distance-time stamp mapping. In further embodiments, multi-focus video data is encoded with consecutive frames spanning different focal distances defining a Group of Pictures (GOP), and/or spanning different hierarchical layers of a multi-layered media stream.

In some embodiments, the redundancy/high correlation between each image in a series of images of a same scene sampled or rendered at different focal lengths (i.e., stack of image frames) is leveraged to store them in standard video storage containers such as MPEG-2 (aka H.222/H.262 as defined by the ITU), H.264 or MPEG-4 Part 10, Advanced Video Coding (MPEG-4 AVC), etc. In some embodiments, a plurality of images sampling multiple depths of focus of the same scene is processed as a (pseudo) time consecutive series of video frames that are encoded into a standard video format. In some embodiments, a plurality of images in an image stack of different focal distances is extracted, rendered, or otherwise generated from light field image data to enable convenient storage of a light field sampling in a standard video format.

FIG. 1 is a schematic of a multi-focus image compression system 100, in accordance with some embodiments. System 100 includes a multi-focus image encoder 130 and a multi-focus image decoder 180. In some embodiments, encoder 130 and decoder 180 reside on a same platform. In the exemplary embodiments represented by FIG. 1, multi-focus image encoder 130 and multi-focus image decoder 180 reside on different platforms networked to a cloud (e.g., internet service or resource) 106.

In some embodiments, light field image data generated by a light field, or plenoptic, camera 110 is employed to render or synthesize an image 120 including a representation of the objects 102, 103. In some embodiments, the light field image data includes pixel values (e.g., intensity, hue) and/or pixel occlusion data from which ray directionality, and/or disparity data may be determined to model scene depth. This light field image data may then serves as the basis for rendering a viewable image of the scene. Rendering or generation of the image frame 120 may be performed by post capture processing of the light field image data by either an image processor integrated into the platform of camera 110 and/or by an image processor on an interfacing platform (not depicted). In some embodiments, light field image data output by light field camera 110 includes sufficient information to generate "multi-focus image data" for scene 104.

As used herein, "multi-focus image data" is image data for a plurality of images frames 120 at different image focal distances (planes) for a single scene. In some embodiments, each image frame at a different image focal distance is a sub-aperture component image derived from the light field image data. In some embodiments, multi-focus image encoder 130 is to receive multi-focus image data generated upstream based on a light field data. In the exemplary embodiment depicted in FIG. 1, multi-focus image data received by multi-focus image encoder 130 is associated with a scene 104 as captured by light field camera 110. Scene 104 further includes object 102 at a first (z) focal distance, and object 103 at a second focal distance. As further illustrated in FIG. 1, the multi-focus image data includes the plurality of images frames: 1, 2, 3, and N. Frame 1 has a nearest focal distance corresponding to object 102. Frame N has a farthest focal distance corresponding to object 103. As described further below in the context of FIG. 2-4, multi-focus image encoder 130 is to encode the multi-focus image data into a video stream 140 including a time series of image frames. Each image frame in the time series has an associated time stamp, such as a presentation time stamp (PTS).

In some embodiments, an encoded video stream output from multi-focus image encoder 130 is shared through cloud network 160 with multi-focus image decoder 180 following any conventional push and/or pull distribution model. Encoded video stream 140 is received by multi-focus image decoder 180, and processed through a video decoder to arrive at a decoded representation of the multi-focus image data (or a decoded representation of one image frame at a selected focal distance). In some embodiments, the decoded representation may be mapped back to a number of focal distances/planes so that one selected frame may be presented for a desired focal distance.

In some embodiments, multi-focus image decoder is part of a platform further including a display screen 175, which may present at least a portion of one or more decoded representation of images frames 1, 2, 3, and N. In some embodiments, in response to decoding video stream 140, a default frame (e.g., frame 1) is displayed. In response to a further input, for example received through a display control 177, video stream 140 may be traversed and decoded based on the mapping between image focal distance and time stamp to select and present one of the plurality of images frames contained in the encoded video stream. Notably, the architecture of system 100 enables multi-focus image data to leverage any standardized video format. Also, multi-focus image decoder 180 provides the interactive experience possible with multi-focus imaging techniques, but without decoder 180 necessarily possessing any native ability to render from, or otherwise process, a light field image. Furthermore, video encoded multi-focus image data utilized by system 100 may benefit from well-established and standardized video compression algorithms resulting in comparatively small video file sizes and/or video stream bitrates for a given series of images associated with a particular scene. Noting further a sub-aperture image generated from handheld light field camera is typically of lower resolution than a conventional 2D image, (ultra) high definition video codec implementations may be sufficient to maintain a light field camera's native multi-focus image data resolution.

Figure 2:
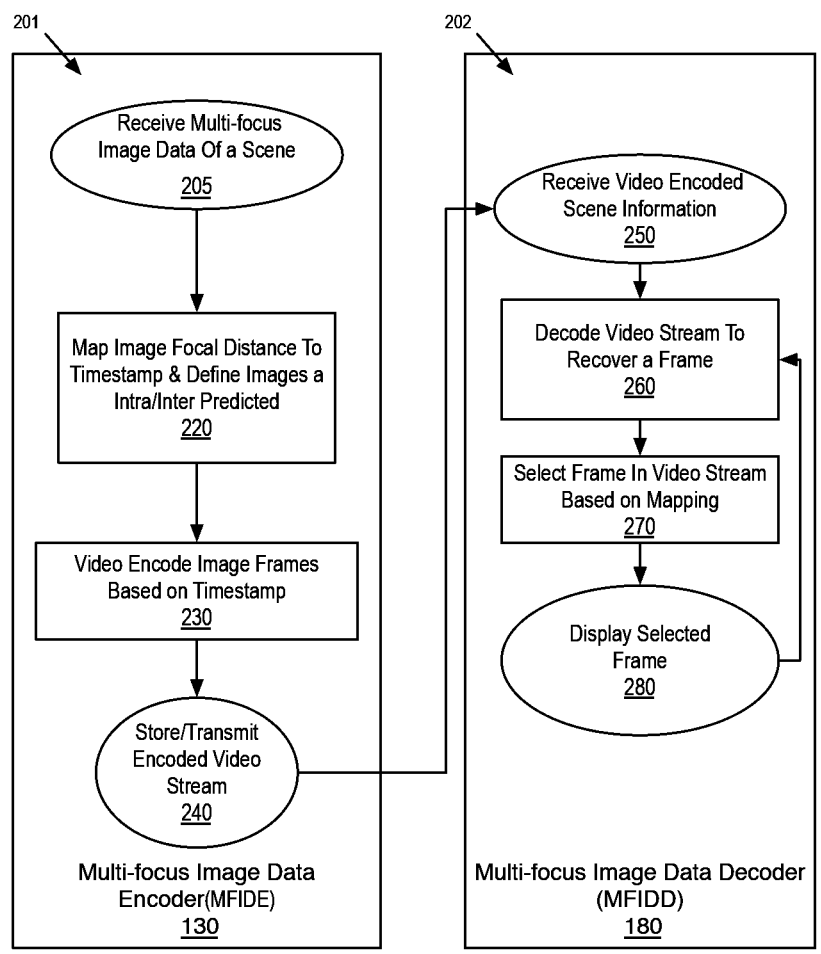
FIG. 2 is a flow diagram depicting methods of video encoding and decoding multi-focus images, in accordance with some embodiments.
Figure 3A:
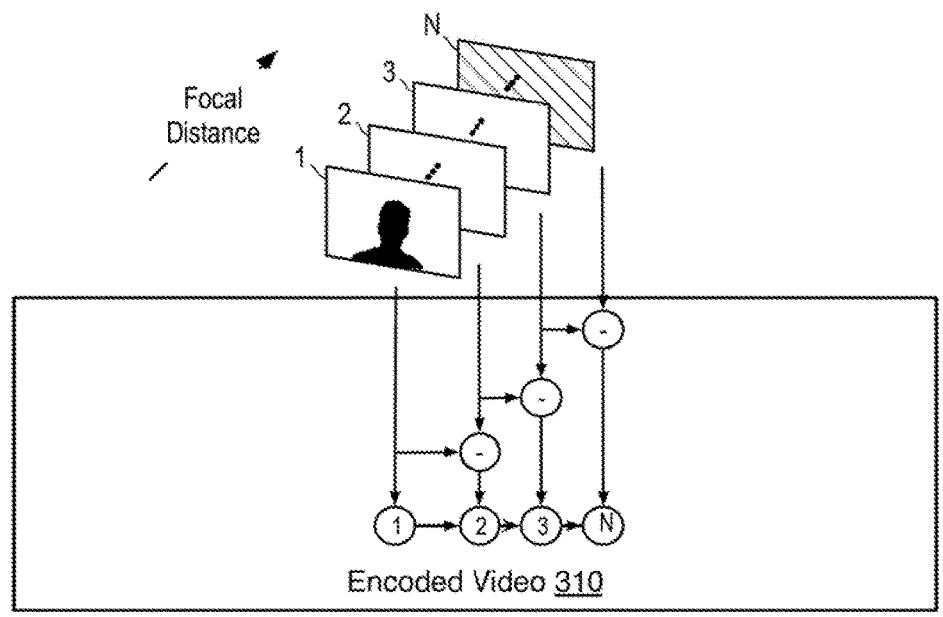
FIG. 3A-3B illustrate video encoding of multi-focus image data, in accordance with some embodiments.
Figure 3B:
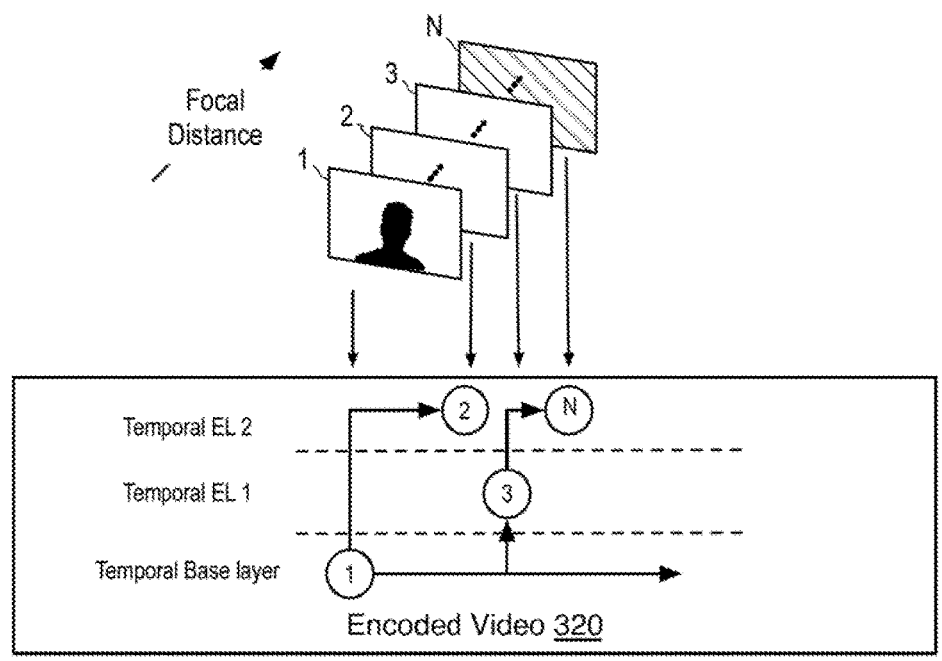

FIG. 2 is a flow diagram depicting method 201 for video encoding multi-focus image data and method 202 for video decoding multi-focus image data, in accordance with some embodiments. In some such embodiments, multi-focus image encoder 130 is to perform encode method 201 as a component of multi-focus image compression system 100.

In some such embodiments, multi-focus image decoder 180 is to perform decode method 202 as a component of multi-focus image compression system 100.

In method 201, a series of multi-focus images are assigned to intra-coded and inter-predicted video frames. Method 201 begins at operation 205 where multi-focus image data of a scene is received. In some embodiments, each image included in the multi-focus image data is associated with a different focal distance and is to be processed as a single frame of a time-based video sequence. In some embodiments, multi-focus image data is streamed in, or otherwise received in the form of uncompressed files of standardized format (e.g., TIFF, etc.). For such embodiments, each image may have a focal distance directly mapped to a time stamp at operation 220. For multi-focus image data received in the form of compressed files of a standardized format (e.g., jpeg, bmp, etc.), such images may be first uncompressed and then have focal distance directly mapped to a time stamp at operation 220. For multi-focus image data received in a proprietary format, method 401 may be employed as described further below.

Referring still to FIG. 2, mapping focal distance to a (pseudo) time stamp aliases the series of images of different focal distance into a series of time sequential images. In some embodiments, N images of a given scene are mapped to a time-order series of N images having distinct time stamps. Mapping of the focal distance to a (pseudo) time stamp may be directly by focal distance or indirectly based on a relative position of an image within the set of N images. For example, N images of a given scene may be ordered from lowest focal distance to highest focal distance. In some embodiments, the monotonically increasing focal-distance ordered series of N images is then mapped to a monotonically increasing time-ordered series of N images. In some embodiments, a first image of lowest focal distance in the focal-distance ordered image frame series is mapped to a first image of earliest time stamp in the N image time-ordered image frame series. A last image of greatest focal distance in the N image focal-distance ordered image frame series is mapped to a last image of latest time stamp in the N image time-ordered image frame series. In other embodiments, the mapping may be in the opposite direction with larger focal distances mapped to earlier time stamps and smaller focal distances mapped to later time stamps.

In some embodiments, various focal lengths/depth values from the focal distance information can be directly mapped to the presentation time stamp (PTS) values for the frames in the created video stream. These time stamps are determined by the set video frame rate of the created video stream. For example, PTS1=1/(video frame rate), PTS2=2/(video frame rate). In embodiments where the depth values in the table are arranged in order of increasing/decreasing focal length and not random, variation between two consecutive focal length stamp images can be expected to be small, thus enabling high compression in the video stream by exploiting redundancy between the images.

At operation 230, the time-sequenced frames of image data are video encoded. Many tens to thousands of image samples of a given scene that have been received, extracted, rendered, or otherwise generated from light field image data may be encoded as a conventional video containing time-based sequence of images. Any known video encoding algorithm or technique may be employed at operation 230. In some embodiments, the time-sequenced frames of image data are video encoded with a MPEG-2 Part 2 (H.222/H.262; ISO/IEC 13818-2:2013) compliant video compression/decompression ("codec"), or a H.263, H.263:1998, or H.263:2000 compliant codec. In some embodiments, the time-sequenced frames of image data are video encoded with an MPEG-4 (H.264 Versions 1-20 including H.264/AVC) compliant codec. In some embodiments, the time-sequenced frames of image data are video encoded with a High Efficiency Video Coding (HEVC) compliant codec, which advantageously supports frame resolutions up to 8192×4320. It will be appreciated that because the time sequenced frames are of a static scene, motion compensation algorithms of a video codec may be leveraged to compress the parallax or change in viewpoint between images associated with successively increasing (decreasing) focal distances. It will be further appreciated that the streaming capability of a video codec may be leveraged as a means of maintaining coherence of a stack of images spanning the multiple focal planes instead of managing multiple separate image files.

In some embodiments, intra-coded frames (I-frames) are formed from an image directly without any modifications. As further illustrated in FIG. 3A for example, image frame 1 is associated with a shortest focal distance and mapped to a lowest time stamp. Image frame 1 is utilized directly as an I-frame in the video encoding. In further embodiments, inter-predicted frames (e.g., P-frames) are created based on differences between images 2, 3, and N in the time series of (multi-focus) images and a reference or each other (or their transformed, DCT versions), thus removing significant redundancy within the series. In some embodiments, one or more multi-focus image frame is video encoded as a bi-directional predicted frame (B-frame). For example, a subset of multi-focus image frames (e.g., every $10^{th}$ frame) is encoded directly as an I-frame, and frames within a threshold number (e.g., 4 frames) are encoded as P-frames while the remainder are encoded as a B-frames. Subsequent editing of decoded representations of the video encoded multi-focus image data may be enhanced by increasing the proportion of I-frames in a given encoded video.

In some embodiments, a series of multi-focus images extracted, collected, received, or rendered from light-field image data are allocated to different hierarchical layers of a scalable video encoding format. For video codec specifications that include support for scalable or layered modes, such as but not limited the Annex G extension of the H.264/MPEG-4 AVC video compression standard, multi-focus image data is converted into a multi-layered video stream. In multi-layered embodiments, the series of images of a same scene associated with different focal distances are mapped to different layers of a media stream. The H.264 standard with the Scalable Video Coding extension defines temporal, spatial, and SNR scalability. In some embodiments, images of different focal length are mapped to different temporal layers of a scalable video stream. For example, as further illustrated in FIG. 3B, image frame 1, associated with a first focal distance, is assigned to a base layer. Image frames 2, 3, and N are assigned to enhancement layers. With temporal scalability, image data is coded at multiple frame rates. For example, a base temporal layer may provide video encoded at 15 frames/second (FPS). Images having different depths of focus may be encoded as temporal enhancement layers in a manner that increases the video frame rate from the base layer rate to 30 FPS or 60 FPS, for example.

At operation 240, the video encoded scene information is streamed out to an electronic memory for video format storage of the image frames associated with a given scene captured by a light field camera. In further embodiments, the stored video encoded scene information is transmitted off the platform hosting multi-focus image data encoder 130, for example to multi-focus image data decoder 130.

Figure 4:
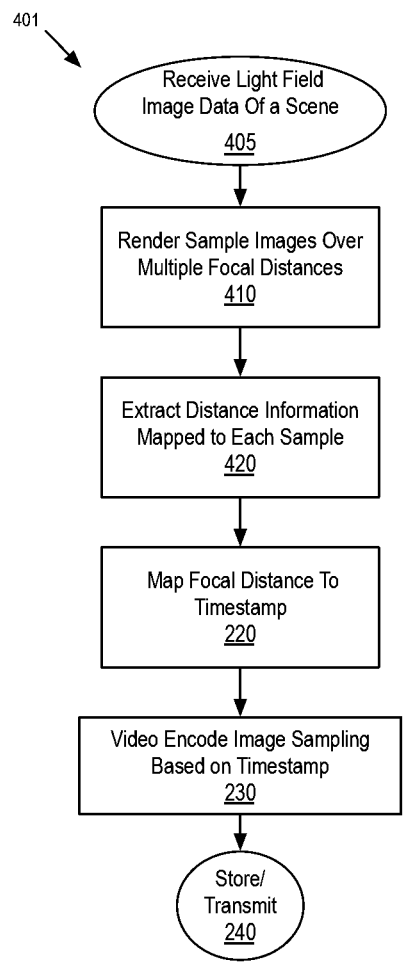
FIG. 4 is a flow diagram depicting a method of sampling and video encoding light field image data of scene, in accordance with some embodiments.

FIG. 4 is a flow diagram depicting a method 401 for sampling and video encoding light field image data of scene, in accordance with some embodiments. Method 401 may, for example, be employed to convert light field image data that is in a proprietary format into a series of multi-focus images, which can then be subsequently encoded in any standard video format. Upon receiving light field image data of a scene at operation 405, sample images spanning multiple focal distances are rendered from the light field image data at operation 410. Any computational photography algorithm appropriate for a given light field image data file may be employed at operation 410. In some embodiments, many tens of sample images are rendered, or otherwise generated, by processing the light field image data file at operation 410. In some embodiments, hundreds or even thousands of sample images are rendered, or otherwise generated, at operation 410 as a more extensive sampling of the essentially infinite data set that may be represented by a light field data file.

Each light field sample image generated at operation 410 is mapped or otherwise associated with corresponding focal distance/depth information at operation 420. In some embodiments, a software API provided by vendors of a proprietary light field image file and/or enlisting a proprietary modeling algorithm, is employed at operation 410 and/or operation 420. Through API calls, sub-aperture component image frames and distance/depth data (e.g., in the form of a depth look up table) may be generated for a given binary light field image data file. The distance data extracted from the light field image data and/or sample rendering operation 410 is to map a particular focal distance indicator (e.g., distance index) to each component image frame output through the API. The collection of image frames representing an image frame sampling of the light field image data and the focal distance look up table may then be input into operations 220 and 230 to map the image sampling to time-stamped frames which are video encoded as described above in the context of method 201 (FIG. 2).

Referring back to FIG. 2, multi-focus image data decoding method 201 begins with receiving the video encoded representation of multi-focus image data (i.e., scene information) at operation 250. At operation 260, received video encoded multi-focus image data is streamed through any known video stream decoder employing a codec that is compatible with that employed at the video encoding operation 230. In some embodiments, the encoded time-sequenced frames of image data are decoded with a MPEG-2 Part 2 (H.222/H.262; ISO/IEC 13818-2:2013) compliant video compression/decompression ("codec"), or a H.263, H.263:1998, or H.263:2000 compliant codec In some embodiments, the encoded time-sequenced frames of image data are decoded with an MPEG-4 (H.264 Versions 1-20 including H.264/AVC) compliant codec, or High Efficiency Video Coding (HEVC) compliant codec. An image frame may be streamed out of the decoding operation 260 based on the desired focal distance. In some embodiments, a frame time stamp associated with a particular focal distance is determined based on the predetermined mapping between the time-based image series and focal distance-based image series (e.g., lowest time stamp:lowest focal distance). In some embodiments, a first I-frame in the video is output to a display as an initial view of the multi-focus image data. For example, an I-frame representing a first focal distance is output to a display screen (e.g., screen 175 in FIG. 1). As further illustrated in FIG. 2, method 202 continues at operation 270 where an image frame at another focal depth is selected from the decoded frame set for display. In some embodiments, frame selection is based on the focal distance-time stamp mapping with a focal distance selection mapped to a particular time stamped video frame.

Figure 5:
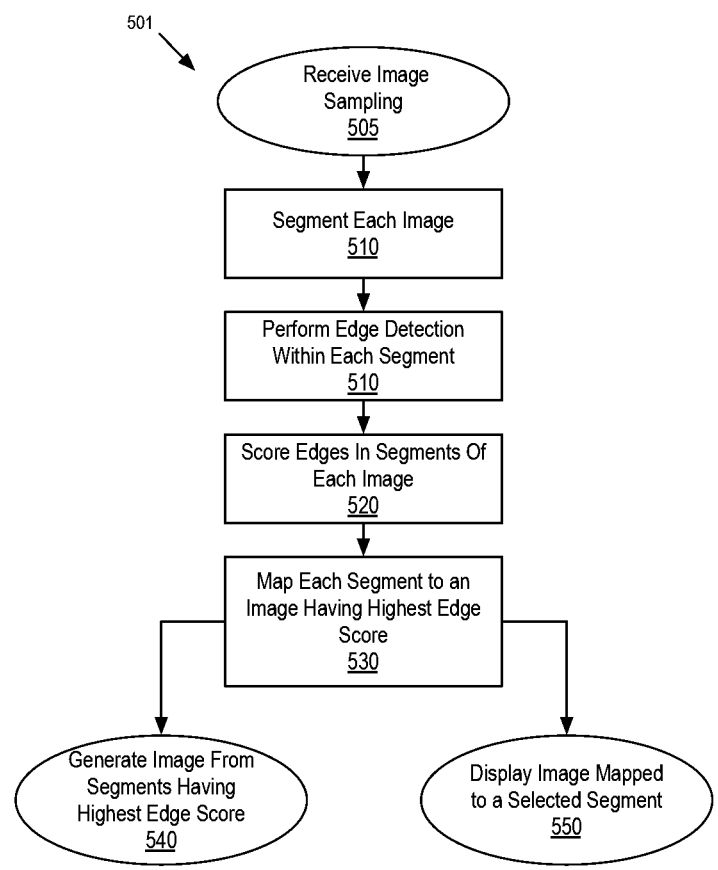
FIG. 5 is a flow diagram depicting a method of displaying an image at a focal distance from a video stream, in accordance with some embodiments.

In some embodiments, a multi-focus image data viewer/player application executing on a platform is to display images from a file stored in a standard video format and/or from an encoded video bitstream. FIG. 5 is a flow diagram depicting a method 500 for displaying an image at a particular focal distance from a video stream, in accordance with some embodiments. Method 500 may be optionally performed within either encoding method 201, or decoding method 202. Method 500 begins with receiving the light field image sampling comprising multi-focus image data at operation 505. At operation 510, each image frame in the series of images comprising the multi-focus image data is segmented or partitioned into a plurality of rectangular widows or bounding boxes. As one example, the picture may be segmented into 330 pixel×330 pixel bounding boxes extending over the area of an image frame. At operation 510, edge detection is performed within each window. Any known edge detection algorithm may be employed for this purpose. At operation 520, an edge score is determined for each window in each image to differentiate those windows in focus from those that are out of focus within a particular image frame.

In some embodiments, each segment is associated with a focal depth. Each segment may be further mapped to the focal depth associated with the image frame within the series of image frames for which that segment has the highest edge score. In some embodiments, to map a segment to a focal-distance, a segment within each frame having the highest edge score for that segment over the series of image frames is stored as metadata associated with the corresponding video encoded frame. During subsequent decode, this metadata is also decoded and utilized to select a video frame for display.

For some embodiments where method 501 is performed as part of decoding method 201, a user may select an image of a particular focal length based on spatial coordinates of an image frame output to a display screen. For example, an identification of points of interest in an image may be received from a user, and the coordinates of the point(s) are mapped to a one of the segments generation at operation 510. The image frame having the highest edge score determined at operation 530 is then output at operation 550 as the image of the correct focal length to best display the selected point of interest in the frame. Hence, selection of a coordinate is translated to the corresponding focal length (focal length stamp) mapped to a particular time stamp in the video stream. The frame at the corresponding time stamp is then accessed from the buffered video stream and the image output to the display. In some other decoding embodiments, the segment(s) having the highest edge score within the image frame are combined to generate an image that is completely in focus. For example, at operation 540 a composite image is constructed by combining the set of segments making up a complete frame area to maximize the cumulative edge score for the composite image frame. This composite image may then output to a display screen.

Figure 6A:
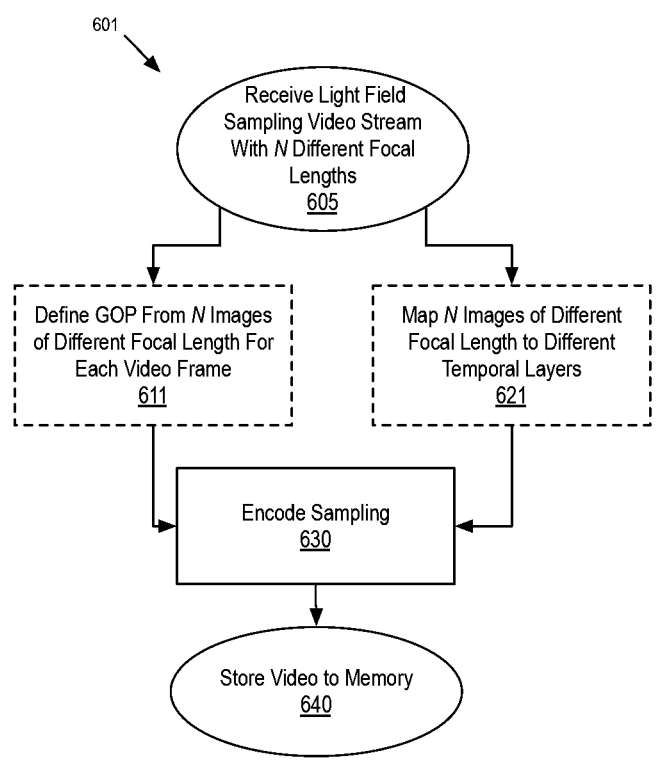
FIG. 6A is a flow diagram depicting a method of video encoding a sampled light field video stream, in accordance with some embodiments.
Figure 6B:
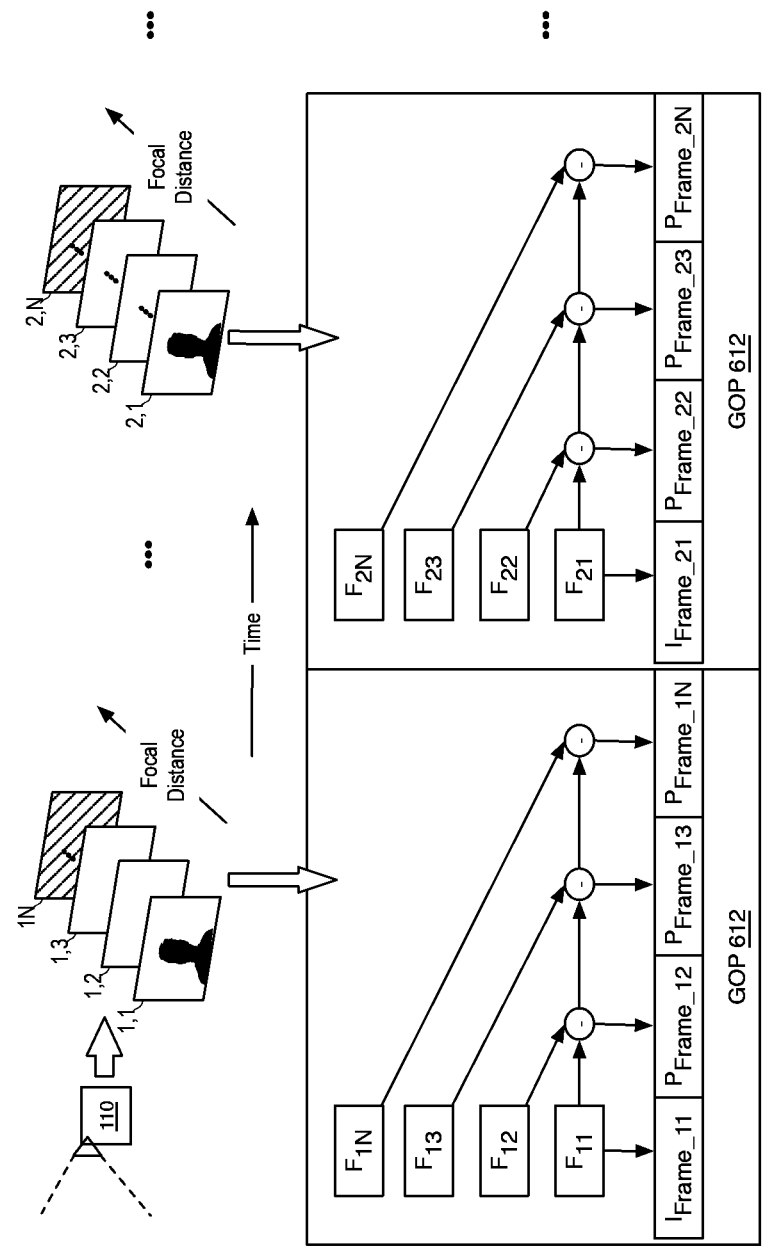
FIG. 6B is a schematic further illustrating video encoding a sampled light field video stream, in accordance with some embodiments.

In some embodiments, light field video data is processed in a manner similar to that described above for light field (still) image data. FIG. 6A is a flow diagram depicting a method 601 for video encoding a sampled light field video stream. In accordance with some embodiments, a light field video sampling received at operation 605 is video encoded by employing the Group of Picture (GOP) structure in the video codec to associate frames of different focal distance. The GOP structure enforces a predetermined order of intra- and inter-frames for each image stack generated for a given scene in light field video data. FIG. 6B is a schematic further illustrating video encoding a sampled light field video stream, in accordance with some such embodiments where each light field video frame is sampled as a stack of N images with different focus. At operation 611, each set of N images is assigned 611 to a GOP of size N that includes a number of I and P(B) frames. At operation 630 (FIG. 6A), the light field video data sampling is converted to a standard encoded video file (e.g., MPEG-2) with each GOP of size N corresponding to the N images that make up each frame of the light field/multi focus video.

Figure 6C:
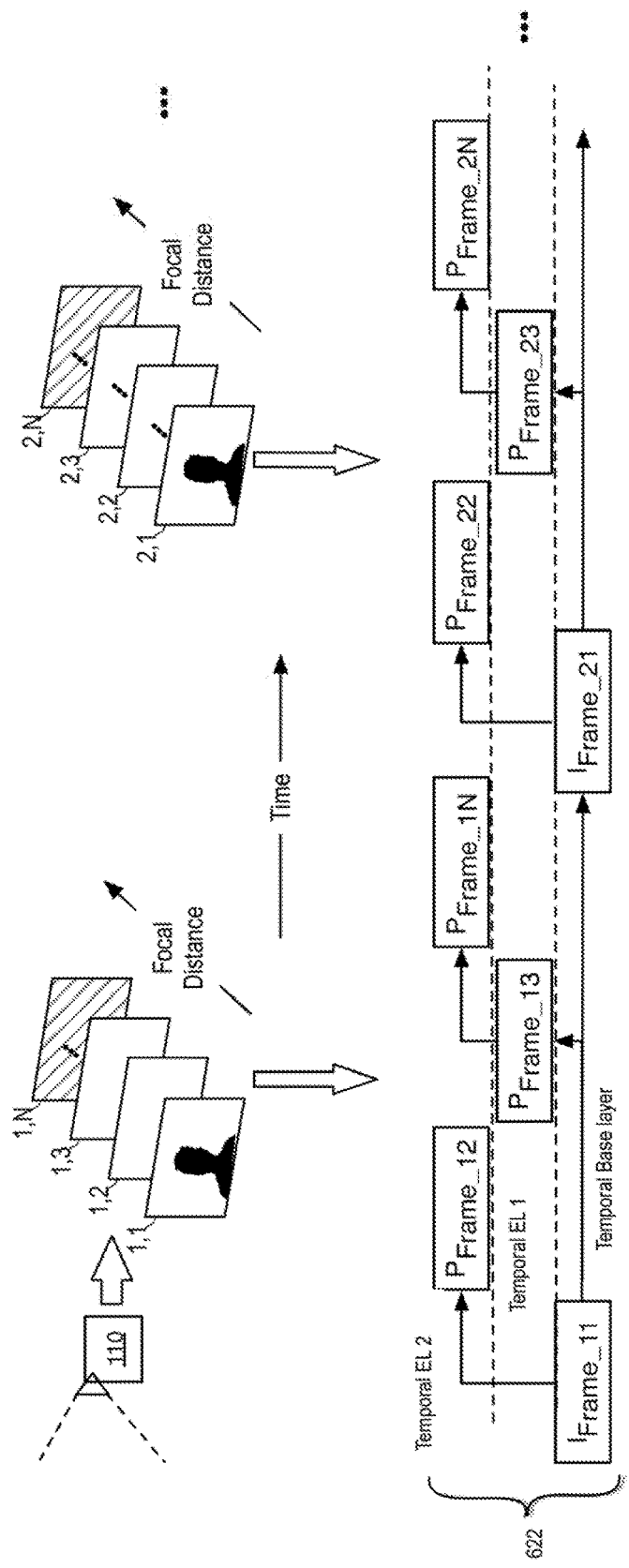
FIG. 6C is a schematic further illustrating video encoding a sampled light field video stream, in accordance with some alternative embodiments.

In some embodiments further illustrated by FIG. 6A, a light field video sampling received at operation 605 is video encoded by employing a multi-layered media structure in the video codec to associate frames of different focal distance to a particular hierarchical layer. In some embodiments, each light field video frame is sampled as a stack of N images with different focus. Each image in the set of N images is assigned at operation 621 to a particular base or enhancement layer. FIG. 6C is a schematic further illustrating video encoding a sampled light field video stream in accordance with some SVC embodiments. At operation 630 (FIG. 6B), the light field video data sampling is converted to a standard encoded video file (e.g., H.264-AVC) with each hierarchical set 622 (FIG. 6C) corresponding to the N images that make up each frame of the light field/multi focus video. The video encoded sampled light field video stream is then stored to memory at operation 640.

Figure 7A:
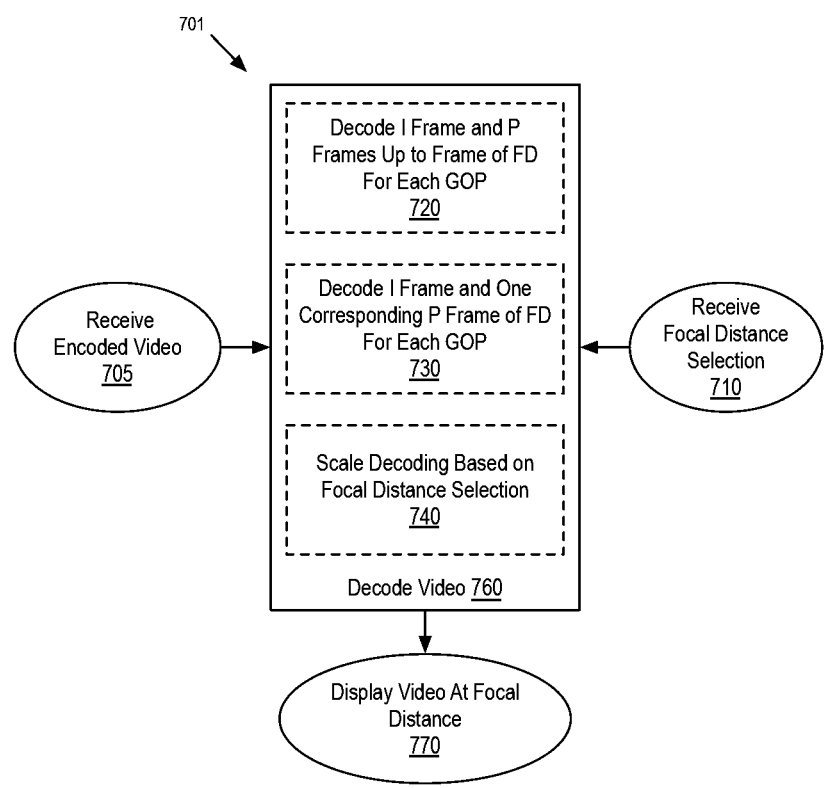
FIG. 7A is a flow diagram depicting a method of video decoding a sampled light field video stream, in accordance with some embodiments.
Figure 7B:
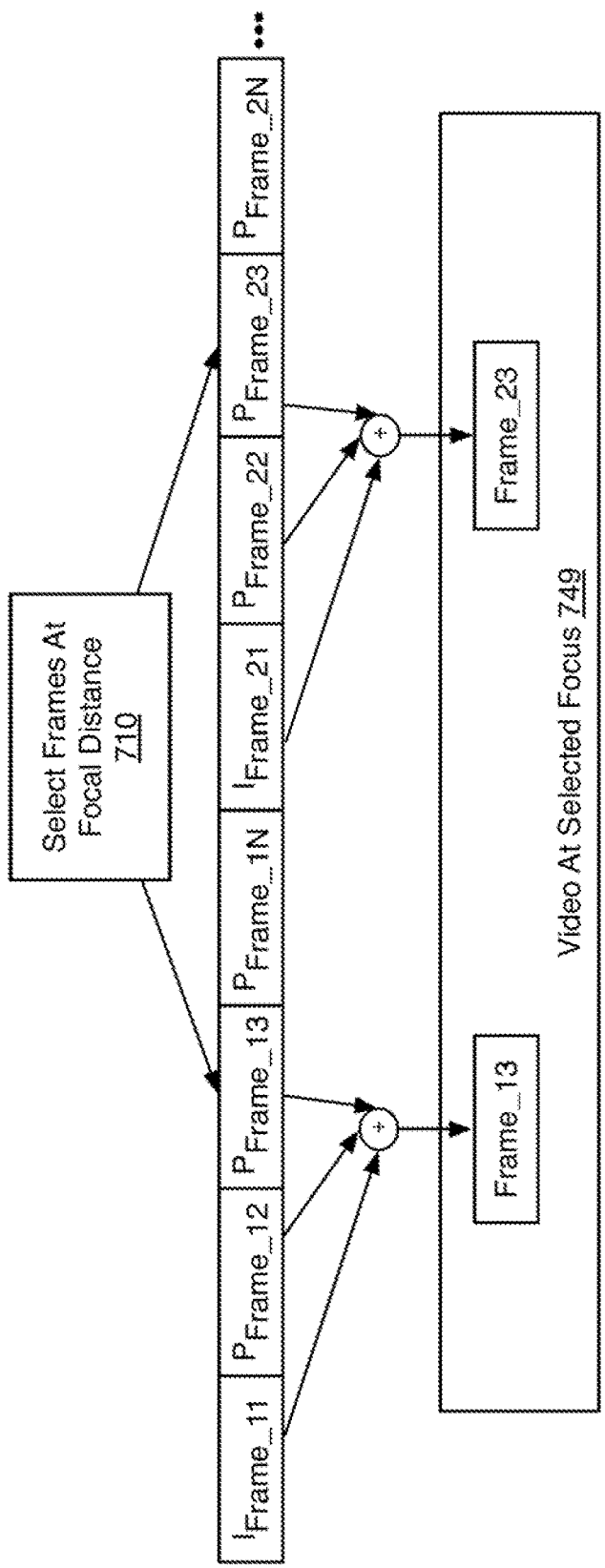
FIG. 7B is a schematic further illustrating video decoding a sampled light field video stream, in accordance with some embodiments.
Figure 7C:
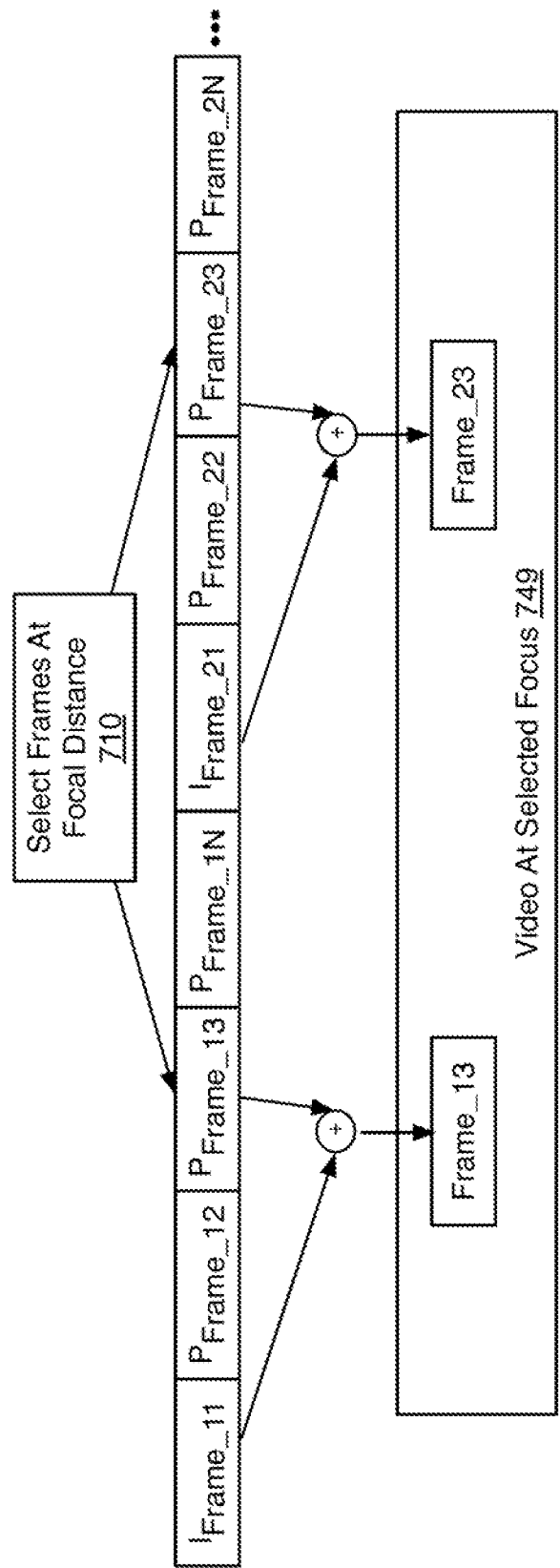
FIG. 7C is a schematic further illustrating video decoding a sampled light field video stream, in accordance with some alternative embodiments.

FIG. 7A is a flow diagram depicting a method 701 for video decoding a sampled light field video stream, in accordance with some embodiments. In method 701, video decoding operation 760 is performed on encoded video received at operation 705 to output a video at a particular focal distance at operation 770. Decoding operation 760 may proceed by any of operation 720, 730, or 740. For operations 720, 730 decoding is based on a GOP encoding structure. FIG. 7B illustrates video decoding frames of certain focal length selected at operation 710 from the standard video encoded format. For the embodiment illustrated in FIG. 7B, each frame of the desired focus is decoded based on the I-frame and all inter-predicted frames within the GOP up to the frame of desired focus (e.g., I-frame_11, P-frame_12, and P-frame_13 to display a frame 13 at the desired focal distance). For the embodiment illustrated in FIG. 7C, each frame of the desired focus is decoded based the I-frame and only the inter-predicted frame of the desired focus (e.g., I-frame_11 and P-frame_13) to create a frame of desired focus from the a multi-focus frame sampling of a light field video. In some embodiments decoding operation 760 entails operation 740 where decoding of a hierarchically encoded video stream is scaled based on a focal distance selection received at operation 710. The scaling process may be implemented in any known manner, for example in the same manner one or more temporal enhancement layers above a certain threshold may be dropped in response to a processor or buffer overrun, etc.

Figure 8:
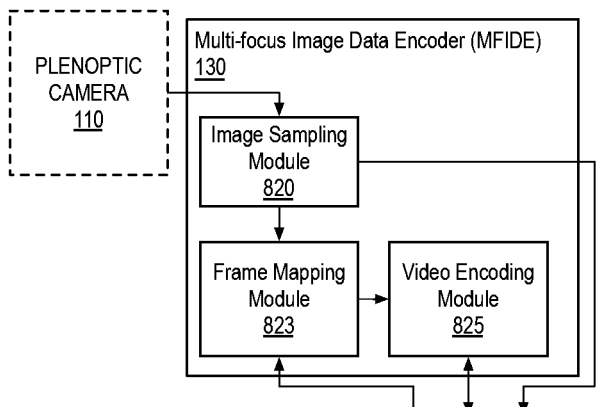
FIG. 8 is a block diagram illustrating a multi-focus image data encoder, in accordance with some embodiments.

FIG. 8 is a block diagram illustrating a multi-focus image data encoder 130, in accordance with some embodiments. Multi-focus image data encoder 130 includes an image sampling module 820, a frame mapping module 823 and a video encoding module 825. In some embodiments, image sampling module 820 includes logic to render the plurality of image frames from light field image data, received for example from plenoptic camera 110. In some embodiments, image sampling module 820 further includes logic to associate each rendered image with a corresponding image focal distance. Frame mapping module 823 is coupled to image sampling module 820 to receive multi-focus image data and/or coupled to memory 850 to access multi-focus image data 830 received from any source. Image frame mapping module 823 includes logic to map an image time stamp to an image focal distance associated with each of a plurality of image frames of a single scene. Image frame mapping module 823 may include logic to perform any of the mapping operations described above. In some embodiments, image frame mapping module 823 further comprises logic to order the plurality of image frames into a series of monotonically increasing focal distance, and to map each image frame in the focal-distance ordered series to a monotonically increasing time stamp indicative of a time-sequential image frame series.

Video encoding module 825 is coupled to memory 850 and frame mapping module 823. Memory 850 is to store encoded video 831 output by video encoding module 825. Video encoding module 825 includes logic to encode the plurality of image frames as a time sequential series of an encoded video based on the image frame time stamps. Video encoding module 825 may include logic to perform, for example, any of the video encoding operations described above. In some embodiments for example, video encoding module 825 includes logic to encode a first image frame in the ordered series as an intra-coded frame, and to encode a second image frame in the ordered series as an inter-predicted fame based on the intra-coded frame.

Figure 9:
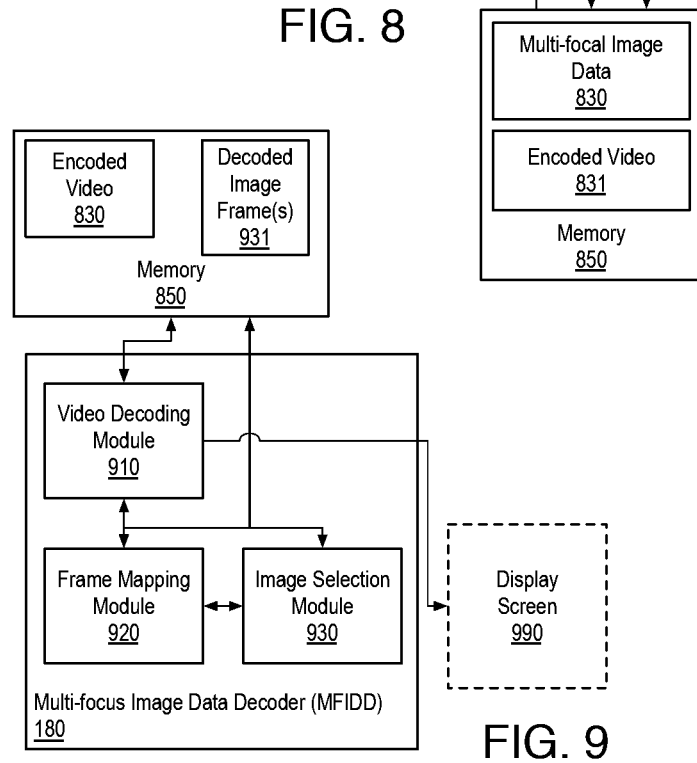
FIG. 9 is a block diagram illustrating a multi-focus image data decoder, in accordance with some embodiments.

FIG. 9 is a block diagram illustrating a multi-focus image data decoder 180, in accordance with some embodiments. Multi-focus image data decoder 180 includes a video decoding module 910, frame mapping module 920, and image frame selection module 930. Video decoding module is coupled to memory 850 and includes logic to decode encoded video 830, for example in accordance with any of the decoding methods described above, into one or more decoded image frame(s) 931 stored to memory or output to display screen 990. In some embodiments, decoding module 910 includes logic to decode an intra-coded frame and one intra-predicted frame associated with the frame time stamp, or to decode an intra-coded frame and each inter-predicted frame up to an inter-predicted frame associated with the frame time stamp. Frame mapping module 920 is coupled to video decoding module 910 and/or image selection module 930. Frame mapping module 920 may include logic to perform any of the mapping operations described above to determine a frame of encoded video corresponding to a particular focal distance. In some embodiments, image frame selection module 930 includes logic to segment each of the image frames into a plurality of bounding boxes, determine an edge detection score associated with each bounding box in each of the image frames, and associate each segment in each of the image frames with a focal depth that has the highest edge detection score. In further embodiments, frame selection module further includes logic to determine the image frame time stamp of the image frame associated with the highest edge detection score for the segment containing the point of interest and cause video decoding module to decode the image frame associated with the image frame time stamp identified by frame mapping module 920. In some embodiments, image selection module 930 outputs the Various components of the systems described herein may be implemented in software, firmware, and/or hardware and/or any combination thereof. For example, various components of encoder 130 or decoder 180 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the exemplary methods (e.g., methods 201, 202, 401, 501, 601, 701) discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of encoder 130 or decoder 180, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system-on-chip (SoC), and so forth.

Figure 10:
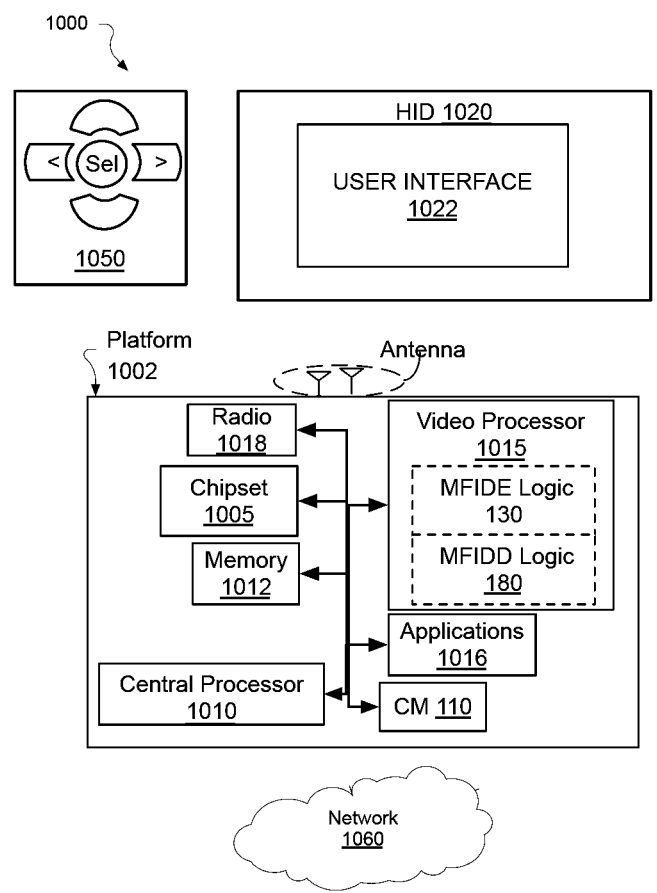
FIG. 10 is a block diagram of an exemplary system employing one or more processor including logic to video encode and/or video decode multi-focus image data, in accordance with some embodiments.

FIG. 10 is a block diagram of an exemplary system employing one or more processor including logic to encode and/or decode multi-focus image data, for example in accordance with one or more embodiment described above. System 1000 may implement all or a subset of the various functional blocks depicted in FIG. 8 or FIG. 9. For example, in some embodiments, a graphics processor 1015 implements a graphics processing system that includes the MFIDE 130, for example having one or more of the features described elsewhere herein to perform any of the methods described in the context of FIG. 1-7. In other embodiments, graphics processor 1015 implements a graphics processing system that includes the MFIDD 180, for example having one or more of the features described elsewhere herein to perform any of the methods described in the context of FIG.

1-7. In one specific exemplary embodiment, graphics processor 1015 includes fixed-function and/or programmable logic circuitry within at least one video encoding module, execution unit (EU), or other IP core, to encode and/or multi-focus image data received or generated by system 1000. System 1000 may be a mobile device although system 1000 is not limited to this context. For example, system 1000 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 1000 may also be an infrastructure device. For example, system 1000 may be incorporated into a large format television, set-top box, desktop computer, or other home or commercial network device.

In embodiments, system 1000 includes a platform 1002 coupled to a HID 1020. A navigation controller 1050 including one or more navigation features may be used to interact with, for example, platform 1002 and/or HID 1020. Camera 1026 may record image data and generate video data for processing by other components of system 1000.

In embodiments, platform 1002 may include any combination of a chipset 1005, processor 1010, memory 1012, storage 1014, graphics processor 1015, applications 1016 and/or radio 1018. Chipset 1005 may provide intercommunication among processor 1010, memory 1012, storage 1014, graphics processor 1015, applications 1016, or radio 1018. For example, chipset 1005 may include a storage adapter (not depicted) capable of providing intercommunication with storage 1014.

Processor 1010 may be implemented as one or more Complex Instruction Set Computer (CISC) or Reduced Instruction Set Computer (RISC) processors; x86 instruction set compatible processors, multi-core, or any other microprocessor or central processing unit (CPU). In embodiments, processor 1010 may be a multi-core processor(s), multi-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1014 may include technology to increase the storage performance enhanced protection for valuable digital media when multiple hard drives are included, for example.

Graphics processor 1015 may perform processing of images such as still or video media data for display, or perform general computing functions in a highly parallel manner. Graphics processor 1015 may include one or more graphics processing unit (GPU), or visual processing unit (VPU), for example. An analog or digital interface may be used to communicatively couple graphics processor 1015 and display 1020. For example, the interface may be any of a High-Definition Multimedia Interface, Display Port, wireless HDMI, and/or wireless HD compliant techniques. Graphics processor 1015 may be integrated with central processor 1010 onto a single chip (i.e., SoC) as a graphics core or provided as part of chipset 1005. In some implementations, graphics processor 1015 may be a stand-alone card communicatively coupled to chipset 1005. In various exemplary embodiments, graphics processor 1015 and/or central processor 1010 invokes or otherwise implements at least one of multi-focus image data encoder 800, or multi-focus image data decoder 900. In exemplary embodiments, graphics processor 1015 includes functionality to perform multi-focus image data encode/decode, for example as describe above.

The multi-focus image data encoding and decoding processes exemplified herein may be implemented in various hardware architectures, cell designs, or "IP cores." As still another embodiment, the methods and functions described herein in the context of a graphics processor may be extended to a general-purpose processor, including a multi-core processor. In further embodiments, the methods and functions may be implemented in a purpose-built consumer electronics device, such as a game console processor or other set-top box.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In embodiments, HID 1020 may include any television type monitor or display. HID 1020 may include, for example, a computer display screen, touch screen display, video monitor, television-like device, and/or a television. HID 1020 may be digital and/or analog. Under the control of one or more software applications 1016, platform 1002 may display user interface 1022 on HID 1020.

In embodiments, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., HID 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but may be integrated into platform 1002 and/or HID 1020. The present disclosure, however, is not limited to the elements or in the context shown or described herein.

In embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 11:
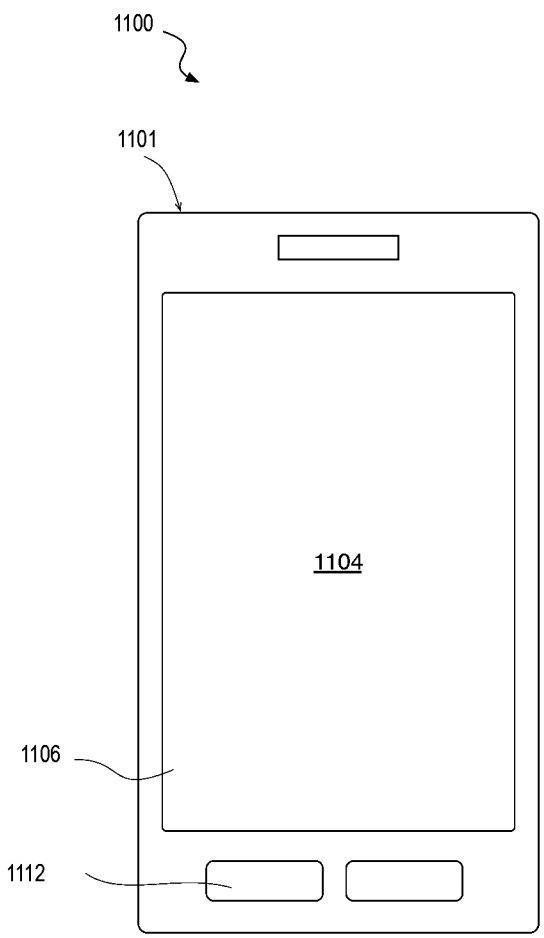
FIG. 11 is a diagram of an exemplary system platform, arranged in accordance with one or more embodiment.

As described above, system 1000 may be embodied in varying physical styles or form factors. FIG. 11 illustrates embodiments of a small form factor device 1100 in which system 1000 may be further embodied. In embodiments, for example, device 1100 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth.

Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104, an input/output (I/O) device 1106 (e.g., touchscreen), and an antenna (not depicted). Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown), or may be digitized by a voice recognition device. Embodiments are not limited in this context.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to particular exemplary embodiments.

In one or more first embodiments, a multi-focus image data encoder comprises an image frame mapping module including logic to map an image time stamp to an image focal distance associated with each of a plurality of image frames of a single scene, each image of the plurality associated with a unique image focal distance. The multi-focus image data encoder further comprises a video encoding module including logic to encode the plurality of image frames as a time sequential series of an encoded video based on the image frame time stamps. The multi-focus image data encoder further comprises an electronic memory to store the encoded video.

In furtherance of the first embodiments, the image frame mapping module further comprises logic to order the plurality of image frames into a series of monotonically increasing focal distance, and map each image frame in the focal-distance ordered series to a monotonically increasing time stamp indicative of a time-sequential image frame series. The video encoding module includes logic to encode a first image frame in the ordered series as an intra-coded frame, and encode a second image frame in the ordered series as an inter-predicted fame based on the intra-coded frame.

In furtherance of the first embodiments, the video encoding module includes logic to implement a codec compliant with one or more of: H.262, H.263, H.264, or high efficiency video coding (HEVC) specifications.

In furtherance of the first embodiments, the video encoding module includes logic to encode the first image frame associated with a first focal distance to a base layer of a multi-layered media bitstream, and to encode the second image frame associated with a second focal distance to an enhancement layer of the multi-layered media bitstream.

In furtherance of the first embodiments, the encoder further comprises an image sampling module including logic to: render the plurality of image frames from light field image data, and associate each rendered image with a corresponding image focal distance.

In furtherance of the embodiments immediately above, the image sampling module further includes logic to segment each of the image frames into bounding boxes, determine an edge detection score for each segment, and associate each segment with a focal distance based on the edge detection score.

In one or more second embodiments, a multi-focus image data decoder comprises a mapping module including logic to determine a frame time stamp associated with a particular image frame focal distance, a video decoding module including logic to decode an encoded video bitstream based on the frame time stamp into a plurality of image frames of a single scene, each image of the plurality associated with one of the image focal distances, and a memory store, or a display screen to display, the decoded image frame.

In furtherance of the second embodiments, the video decoding module further includes logic to decode an intra-coded frame and one intra-predicted frame associated with the frame time stamp, or to decode an intra-coded frame and each inter-predicted frame up to an inter-predicted frame associated with the frame time stamp.

In furtherance of the second embodiments, the decoder further comprises an image frame selection module including logic to segment each of the image frames into a plurality of bounding boxes, determine an edge detection score associated with each bounding box in each of the image frames; and associate each segment in each of the image frames with a focal depth that has the highest edge detection score.

In furtherance of the embodiment immediately above, the decoder further comprises an image frame selection module including logic to determine the image frame time stamp of the image frame associated with the highest edge detection score for the segment containing the point of interest. The video decoding module is to decode the image frame associated with the determined image frame time stamp.

In one or more third embodiment, a computer-implemented method of encoding multi-focus image data, the method comprising receiving a plurality of images of a scene, each image of the plurality associated with a unique image focal distance. The method further comprising mapping the image focal distance associated with each of a plurality of image frames to a time stamp, encoding the plurality of image frames as a time sequential series of an encoded video based on the image frame time stamps, and storing the encoding video to an electronic memory.

In furtherance of embodiment immediately above, mapping the image focal distance to a time stamp further comprises, ordering the plurality of image frames into a series of monotonically increasing focal distance, and mapping each image frame in the focal-distance ordered series to a monotonically increasing time stamp indicative of a time-ordered series. Encoding the plurality of images further comprises, encoding a first image frame in the ordered series as an intra-coded frame, and encoding a second image frame in the ordered series as an inter-predicted fame based on the intra-coded frame.

In furtherance of the embodiment immediately above, the encoding video further comprises employed codec compliant with one or more of: H.262, H.263, H.264, or high efficiency video coding (HEVC) specifications.

In furtherance of the third embodiment, the encoding video further comprises encoding the first image frame associated with a first focal distance to a base layer of a multi-layered media bitstream, and encoding the second image frame associated with a second focal distance to an enhancement layer of the multi-layered media bitstream.

In furtherance of the third embodiment, the method further comprises rendering the plurality of image frames from light field image data, and associating each rendered image with a corresponding image focal distance.

In furtherance of the third embodiment, the method further comprises segmenting each of the image frames into bounding boxes, determining an edge detection score for each segment, and associating each segment with a focal distance based on the edge detection score.

In one or more fourth embodiments, a computer-implemented method of decoding multi-focus image data comprises determining a frame time stamp associated with a particular image frame focal distance, and decoding an image frame from an encoded video bitstream based on the frame time stamp. The method further comprises storing the decoded image frame to an electronic memory.

In furtherance of the fourth embodiment, the method further comprises segmenting each of the image frames into a plurality of bounding boxes, determining an edge detection score associated with each bounding box in each of the image frames, and associating each segment in each of the image frames with a focal depth that has the highest edge detection score.

In furtherance of the embodiment immediately above, the method further comprises determining the image frame time stamp of the image frame associated with the highest edge detection score for the segment containing the point of interest, and the video decoding further comprises decoding the image frame associated with the determined image frame time stamp.

In one or more fifth embodiments, a multi-focus image data encoder comprising a means to perform any one of the third embodiments.

In one or more sixth embodiments, a multi-focus image data encoder comprising a means to perform any one of the fourth embodiments.

In one or more seventh embodiments, one or more computer readable media has instructions stored thereon, which when executed by a processor, cause the processor to perform any one of the third embodiments.

In one or more eighth embodiments, one or more computer readable media has instructions stored thereon, which when executed by a processor, cause the processor to perform any one of the fourth embodiments.

In one or more ninth embodiments, one or more computer readable media has instructions stored thereon, which when executed by a processor, cause the processor to perform the method comprising receiving a plurality of images of a scene, each image of the plurality associated with a unique image focal distance, mapping the image focal distance associated with each of a plurality of image frames to a time stamp, encoding the plurality of image frames as a time sequential series of an encoded video based on the image frame time stamps, and storing the encoding video to an electronic memory.

In furtherance of the ninth embodiments, the instructions further to cause the processor to perform the method where mapping the image focal distance to a time stamp further comprises ordering the plurality of image frames into a series of monotonically increasing focal distance, mapping each image frame in the focal-distance ordered series to a monotonically increasing time stamp indicative of a time-ordered series. Encoding the plurality of images further comprises encoding a first image frame in the ordered series as an intra-coded frame, and encoding a second image frame in the ordered series as an inter-predicted fame based on the intra-coded frame.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A multi-focus image data encoder, comprising:
   a processor to:
      render a plurality of image frames, each having a unique image focal distance, from light field image data collected for a single scene;
      order the plurality of image frames into a series of frames having monotonically varying focal distances;
      map each image frame in the focal-distance ordered series to a monotonically varying time stamp indicative of a time-sequential image frame series;
      encode the plurality of image frames as a time sequential series of an encoded video based on the image frame time stamps, wherein the processor is to encode a first image frame in the ordered series as an intra-coded frame, and encode a second frame in the ordered series as an inter-predicted frame based, at least in part, on the intra-coded frame; and
   an electronic memory to store the encoded video.

2. The encoder of claim 1, wherein the processor is to implement a codec compliant with one or more of: H.262, H.263, H.264, or high efficiency video coding (HEVC) specifications.

3. The encoder of claim 1, wherein the processor is to encode the first image frame associated with a first focal distance to a base layer of a multi-layered media bitstream, and to encode the second image frame associated with a second focal distance to an enhancement layer of the multi-layered media bitstream.

4. The encoder of claim 1, wherein the processor is to:
   segment each of the image frames into bounding boxes;
   determine an edge detection score for each segment; and
   associate each segment with a focal distance based on the edge detection score.

5. A computer-implemented method of encoding multi-focus image data, the method comprising:
   rendering a plurality of image frames, each having a unique image focal distance, from light field image data collected for a single scene;
   ordering the plurality of image frames into a series of frames having monotonically varying focal distances;
   mapping each image frame in the focal-distance ordered series to a monotonically varying time stamp indicative of a time-sequential image frame series;
   encoding the plurality of image frames as a time sequential series of an encoded video based on the image frame time stamps, wherein the encoding comprises encoding a first image frame in the ordered series as an intra-coded frame, and encoding one or more second frame in the ordered series as an inter-predicted frame based, at least in part, on the intra-coded frame; and
   storing the encoded video to an electronic memory.

6. The method of claim 5, wherein the encoding video further comprises a codec compliant with one or more of: H.262, H.263, H.264, or high efficiency video coding (HEVC) specifications.

7. The method of claim 5, wherein the encoding video further comprises:
   encoding the first image frame associated with a first focal distance to a base layer of a multi-layered media bitstream; and
   encoding the second image frame associated with a second focal distance to an enhancement layer of the multi-layered media bitstream.

8. The method of claim 1, further comprising:
   segmenting each of the image frames into bounding boxes;
   determining an edge detection score for each segment; and
   associating each segment with a focal distance based on the edge detection score.

* * * * *